United States Patent

Cotelle

[15] 3,640,796
[45] Feb. 8, 1972

[54] A DECORATIVE BUILDING ELEMENT

[72] Inventor: Marie-Josephe Cotelle, 73 rue Victor Hugo Puteaux, Haute-de-Seine, France

[22] Filed: Oct. 17, 1969

[21] Appl. No.: 867,407

[30] Foreign Application Priority Data

Oct. 18, 1968  France..................170438

[52] U.S. Cl..................161/43, 52/309, 52/616, 161/161, 161/193
[51] Int. Cl..........................B37b 5/18
[58] Field of Search............161/43, 159, 193, 160, 190, 161/208, 44, 161; 52/306, 309, 311, 616

[56] References Cited

UNITED STATES PATENTS

| | | | |
|---|---|---|---|
| 3,507,738 | 4/1970 | Prusinski et al. | 161/43 |
| 3,232,017 | 2/1966 | Prusinski et al. | 52/309 |
| 3,133,891 | 5/1964 | Ceyzeriat | 260/18 |
| 3,522,142 | 7/1970 | Wismer et al. | 161/193 X |

*Primary Examiner*—Philip Dier
*Attorney*—Finnegan, Henderson & Farabow

[57] ABSTRACT

A decorative building element comprised of at least one support layer of a foamed, cellular plastic material and a colored layer of an elastomeric organosilic material which adheres to the cellular material. The method comprises forming a paste of a self-vulcanizable material, mixing a color additive into the paste to disperse color into the paste, spreading the paste into a thin layer on a cellular foam plastic material to which the paste can adhere and vulcanizing the paste to form a decorative building element.

5 Claims, 4 Drawing Figures

PATENTED FEB 8 1972

3,640,796

INVENTOR
MARIE-JOSEPHE COTELLE

BY Finnegan, Henderson & Farabow
ATTORNEYS

DECORATIVE BUILDING ELEMENT

This invention relates to new building materials and their methods of construction. More particularly, this invention relates to new building materials which have interesting artistic effects, good thermal insulation, interchangeability among the most moveable elements, great flexibility (lightness), and when the need arises, remarkable optical qualities.

The prior art has developed decorative elements in the form of flexible silicone sheets which have shades of color arranged next to each other, and on top of each other, the colors corresponding to different layers of paste. The prior art has also developed a process for manufacturing these decorative elements.

The decorative elements of the prior art are interesting because their flexibility lends very well to the manufacture of simulated stained-glass windows.

Unfortunately, the thermal conductivity of these decorative elements or sheets are considerable, even if they are put between two pieces of glass. In addition, the lighted side, which does not appear transparent often gives off an inaesthetic view of the panel of glass seen in this way.

Although foamed or expanded plastic materials are known for their insulation properties, they have not heretofore been used as decorative building elements because the majority of these plastic materials, when put in contact with organic liquid or paste products, either expand, become deformed, or destroy their internal void structure.

Accordingly, it is an object of this invention to provide novel building elements which overcome these disadvantages and to obtain effects which result in an interesting and decorative constructional element.

It is a further object of this invention to provide a novel decorative building element made from a foamed or expanded plastic material.

Additional objects and advantages will be set forth in part in the description which follows, and in part will be obvious from the description, or may be learned by practice of the invention, the objects and and advantages being realized and attained by means of the instrumentalities and combinations particularly pointed out in the appended claims.

To achieve the forgoing objects and in accordance with its purpose, as embodied and broadly described, the decorative building material of this invention comprises at least one support layer of a foamed, cellular plastic material and a colored layer of an elastomeric organosilic material adhered directly to the cellular material.

Preferably, at least one sheet of a transparent material is secured to the organosilic material.

The method of this invention comprises forming a paste of a vulcanizable organosilic material, mixing a coloring additive into the paste to disperse color into the paste, spreading the paste into a first thin layer on a cellular, foamed, plastic material to which the paste can adhere, and vulcanizing the paste to form a decorative building material.

Preferably, a second layer of a vulcanizable organosilic material having a different color additive dispersed therein is applied to the first layer at selected, separate areas of the top surface of the first layer before completing the vulcanization of the first layer. The layers of organosilic material are then worked to obtain a decorative effect.

It is to be understood that both the foregoing general description and the following detailed description are exemplary and explanatory, but are not restrictive of the invention.

The accompanying drawings illustrate examples of preferred embodiments of the invention and together with the description serve to explain the principles of the invention.

Figure 1:
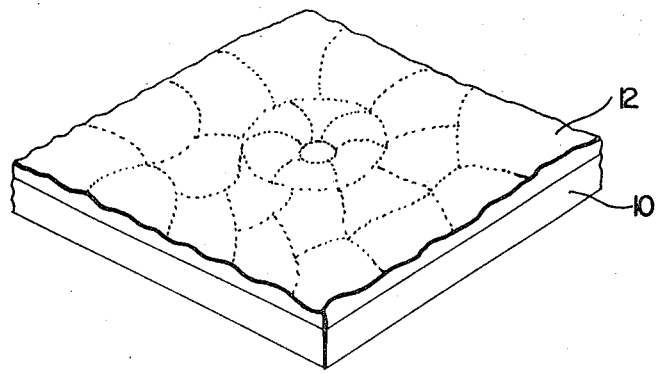
FIG. 1 is a perspective view of a decorative element made in accordance with the teachings of the invention, and comprising a foam support layer and a top layer of a colored silicone elastomer.

In accordance with this invention, the decorative building material comprises at least one support layer of a foamed, cellular plastic material. As here embodied, the expanded or foamed plastic forming the support layer can be either planar in form, as shown by reference numeral 10 in FIG. 1, or it can be shaped or sculpted by incisions, drilling cuts, solvents or in any other suitable manner to form a nonplanar, shaped support layer.

The support layer can be made of any known foamed or expanded material. The foamed materials are usually formed from compact, expandable polymeric materials which contain a minor amount of a low-boiling blowing agent which expands the polymer by flash evaporation upon the application of heat.

The vaporization of the blowing agent creates a multiplicity of internal voids in the plastic giving it an expanded or foamed, cellular structure. As examples of a foamed plastic material, there are foamed rubber materials, both natural and artificial, silicone foams, polystyrene foams, polyethylene foams and polyurethane foams. These foams can be used either in a soft or rigid state. Expanded plastic material, which can also be used, include, for example, the expanded polystyrene and especially the type of expanded polystyrene made up of an agglomerate of expanded particles.

In accordance with the invention, a colored layer of an elastomeric organosilic material is adhered to the cellular material. As here embodied, the colored organosilic layer 12 can be in planar form or can be shaped or sculpted to have a varying thickness to produce any desired decorative or artistic effect. The organosilic material adheres to the cellular material without altering the cellular or void structure of the support layer.

The elastomeric organosilic materials that are preferably employed are the commercial grade silicone base compositions which can be vulcanized at room temperature. Among these, those having a cetyl polysiloxane base and self-vulcanizable under the action of water, water vapor or moist air, are most preferred. Compositions of this preferred type are commercially available and examples of this type of composition are described in U.S. Pat. No. 3,133,891. These compositions could contain a small proportion of a solvent, such as cyclohexane, to form pastes viscous enough to be shaped or sculpted.

Alternatively, one can use organosilic compositions containing catalysts. These compositions may also be worked or shaped while still in paste form and can then be vulcanized by exposure to heat. These compositions are preferably heated by infrared ray to cause vulcanization.

Other elastomeric silicone materials can be used as well as any similar elastomeric commercial grade composition which can be applied as a paste and vulcanized to form an elastomer. However, the elastomeric silicones are the most preferred composition.

The elastomeric silicones are preferably colored before vulcanization, by the usual pigments, such as cobalt blue, red, yellow, reddish brown, brownish yellow and such, in the usual granulometric qualities used in painting.

If desired, other color additives can be used, but those sensitive to light are not recommended. A particularly preferred process for tinting the silicone paste is to mix in it oil paints, and especially quality oils used by artists.

Of course, the properties of the cellular or expanded plastic support layer must be taken into account when choosing the silicone mixture to be used so that the temperature to be applied during vulcanization will not destroy the composite article. The selection of proper materials to satisfy this requirement can be readily determined by those skilled in the art.

In a preferred embodiment of this invention, a second layer of a vulcanized organosilic material having a different color additive than the first layer is applied to the top surface of the first layer at selected areas of that layer. The total thickness of the two layers at any given area, and the thickness of each layer in the given area can be varied by shaping or working the layers to produce any desired decorative effect.

Thus, according to this invention, the association of at least one colored and worked layer of an elastomeric silicone base either with a foamed or expanded plastic support layer results in new artistic effects, particularly in utilizing the transparency of the matter thus defined.

One can voluntarily choose the foamed plastic, the end color of the granules forming the expanded product, the thickness of each of the layers and the total thickness of the expanded products to achieve the desired effect.

The new building material of this invention is transportable and the physical characteristics of the building material can be conveniently changed at the time of manufacture to produce a material having a desired set of characteristics.

Figure 2:
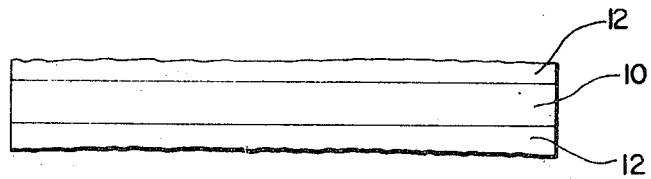
FIG. 2 is an end view of an alternate embodiment of this invention showing a foam support layer and a silicone elastomer layer on each of its opposing surfaces.

It is possible to present this new building material in many forms such as slabs, notably plastic slabs formed by an expanded agglomerate of granules. These slabs have on one side or as shown in FIG. 2 on both surfaces, a layer of elastomeric silicone material 12 properly colored. The slabs are very light and are not subject to change by climatic elements, or usual wear and tear of maintenance or the like. The slabs collect very little dust and are easily washed. The slabs give the effect of a translucent granite material with varying shades of color resulting in very artistic effects. These slabs possess excellent thermal and acoustical insulation and are thus particularly suited for use as building materials.

Even seen simply by lighting (and not by its transparency) it gives off a different effect, but equally new and pleasant. Thus, the elements could be used decoratively, for pictures or for similar uses.

Figure 3:
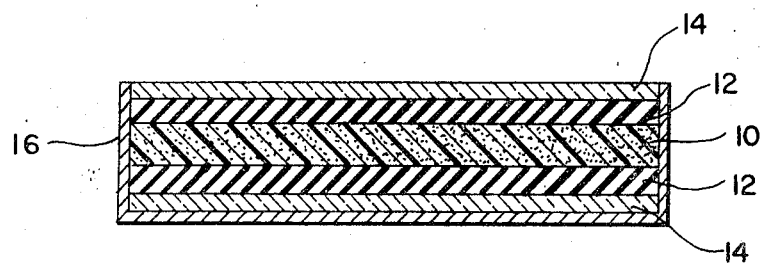
FIG. 3 is a sectional view of still another embodiment of this invention showing a foamed support layer having a layer of silicone elastomer on each of its opposing surfaces and a transparent glass sheet attached to each of the elastomeric layers.

If desired, the slabs can be protected on one surface by a rigid transparent plate, preferably glass. This protective surface may be adhered to the silicone layer if desired. As shown in FIG. 3, one can also put these slabs between two sheets or plates 14 of this protective transparent material.

Thus, a composite tile is obtained which has not only good mechanical resistance, thermal insulation on the same order as that of insulating tiles in glass of the same thickness, but also a lovely artistic effect resulting from its translucency. Such tiles are particularly recommended for dividers and dividing walls. When used as dividers, it is recommended that the tiles be produced in standard sizes and have mating edges which can preferably be joined together by an elastomeric silicone to facilitate their assembly.

Tiles can be manufactured by first applying properly colored silicone paste directly on one surface of the expanded or foamed plastic support layer and by then applying on the yet soft silicone paste a sheet of glass. Alternatively, the silicone paste can first be applied on the sheet of glass and then the support layer of cellular material is applied on this paste. The other surface, if desired, can be treated by the same process. This other surface can, of course, have an elastomeric silicone covering which is not colored or tinted and the surface can be made to adhere to a sheet of glass, if desired. Naturally, an entirely different effect can be produced by adhering the silicone layer to the glass.

The silicone base layer may be spread onto the cellular support layer by hand or by a spreader knife. If a knife is used it may have an uneven edge, whereby the paste will be distributed at uneven heights to form lands and depressions. Obviously, layers of paste may be superimposed on one another as long as the spread has not vulcanized.

Following the spreading, designs may be formed or inlaid in the spread to produce an embossed surface. If desired, for less artistic objects, it is possible to apply the layer of silicone base paste by machine by the usual techniques of stamping or molding. Thus, it is possible to repeatedly produce these structures.

In another embodiment of the invention, the foamed or expanded plastic material is given a convex shape and covered on one external surface by the above-mentioned properly colored elastomeric silicone to form a decorative column. The decorative column, lighted from the inside, can be used as a building element, can be used artistically for lighting, or can be used simply as a decoration.

According to the invention, the new element can, of course, be produced in any form in order to obtain either a sculpture, a shaped decorative object, or any other shape. These new objects are at their best when they are lighted from within.

The structures, if so desired, can be reinforced on either side both from the exterior and the interior by a reinforcing element such as metal pins, screens, metal nails, lattices, enlarged polycarbonate elements, or other similar products. The size and strength of the reinforcing elements is chosen according to the effect desired. It can be decoratively or visibly arranged or, on the other hand, arranged between two slabs of foamed or expanded material which make up the structures.

These reinforcing elements become adherent to one or two of the slabs by use of an elastomeric silicone layer of the type already mentioned.

Figure 4:
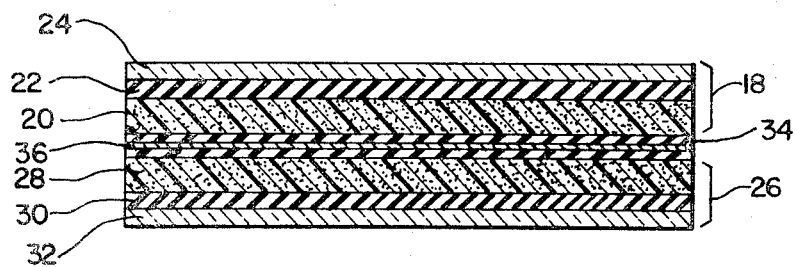
FIG. 4 is a sectional view of a further embodiment of this invention showing a laminate containing two layers of foam.

Thus, as shown in FIG. 4, a first slab, generally 18, comprising a foamed support layer 20, a colored elastomeric layer 22, and a glass plate 24, and a second slab, generally 26, comprising a foamed support layer 28, a colored elastomeric layer 30, and a glass plate 32 are adhered to each other by an elastomeric layer 34 having a reinforcing element 36 embedded therein.

Of course, these building elements can be arranged singly or in an agglomerate to be used for any type of construction such as doors, dividers, platforms, floors, and especially construction beams and folding walls. When used for such purposes, the building elements can be used in metal containers (cases) in order to arrive at the desired effect. They can also be glued to iron cement slabs or the like. The silicone layer can also be varnished, especially with a polymerizable varnish having a polyester base.

The invention is especially useful for panels for folding walls having one or more foamed or expanded slabs. The slabs have, on at least one side, a colored elastomeric silicone layer and at least one glass plate, and if desired at least one reinforcing element, all of which would be encased in metal, for example, as shown by metal casing 16 in FIG. 3. When used for folding walls, these panels are used in the usual manner.

It is thus very evident that production of the above is very desirable and many other similar objects can also thus be produced.

The following example is given as illustration of production of a building element according to the invention.

EXAMPLE

An expanded polystyrene slab of a thickness of 3 mm. is cut in a square of 50 cm. on the side.

A mixture of an elastomeric organosilic paste and a coloring additive is prepared by mixing the additive into the paste to disperse color into the paste. This organosilic commercial grade paste is vulcanized at room temperature and has an organopolysiloxane and a cetylpolysiloxane base, and contains 25 percent cyclohexane (marketed under the trademark Rhodorsil CAF 3, 75 percent by the Societe Rhone-Poulene). The color of the paste is very dark blue obtained by using a fine oil color used by artists. The polystyrene slab is carefully arranged horizontally, and on this slab the tinted organosilicic paste is applied with a spatula, while smoothing over unequal thicknesses in order to bring out the color. It is exposed to the air until this layer holds its shape, then a similar type of paste is applied in selected areas, but this organosilicic paste is tinted green by an emerald color oil such as is used in painting. The design is completed by scratches with the spatula. Then a coating of glass, 5 mm. in thickness is applied on this surface.

On the opposite side of the expanded polystyrene slab, one applies a very light layer of the same organosilicic paste, but untinted. Also applied on this surface at the same time is a lattice, the same size as the slab, formed by an iron grill of square iron nails.

The grill is put into place by a thin layer of the same untinted organosilicic paste. It is then left to self-vulcanize under the action of the water vapor present in the atmosphere for 1 night. The result is a translucent panel having good mechanical resistance and also possessing good thermal insulation.

This panel is built in an aluminum U-shape casing and can be used for building folding walls.

Several panels of this kind built in appropriate casings make a resistant, translucent and light door 1 meter in width and 2 meters in height. A door formed in this manner is light in weight and provides an attractive entrance way.

The invention in its broader aspects is not limited to the specific details shown and described and departures may be made from such details without departing from the principles of the invention and without sacrificing its chief advantages.

I claim:

1. A decorative building material comprising a first support layer of a foamed cellular plastic material, a second layer of a colored elastomeric organosilic material adhered to one surface of the foamed support layer, a third layer of an elastomeric organosilic material adhered to an opposite surface of the foamed support layer, a rigid transparent plate of glass adhered to the second elastomeric layer, a rigid transparent plate or glass adhered to the third layer of elastomeric layer, and a metal casing for the layers.

2. A decorative building material comprising:
   a first slab of material comprising a support layer of a foamed cellular plastic material, and a layer of a colored elastomeric organosilic material adhered to the support layer;
   a second slab of material comprising a support layer of a foamed cellular plastic material and a layer of a colored elastomeric organosilic material adhered to the cellular material; and
   an elastomeric silicone layer joining said first and second slabs together and having a reinforcing element.

3. The building material of claim 1 which includes a reinforcing element.

4. A decorative building material according to claim 1, wherein the foamed cellular plastic material is selected from the group comprising rubber, silicone, polystyrene, polyethylene and polyurethane foams.

5. A decorative building material, according to claim 2, wherein the foamed cellular plastic material in each slab is selected from the group comprising rubber, silicone, polystyrene, polyethylene and polyurethane foams.

* * * * *